Aug. 14, 1962  R. E. WHITE ETAL  3,049,707
TRAVELING WAVE PRESENTATION DEVICE
Filed May 1, 1951  2 Sheets-Sheet 1

INVENTORS
ROGER E. WHITE
ISAAC W. FULLER
NEIL L. DAVIS
BY D.G. Snyder
Howard White  ATTORNEYS

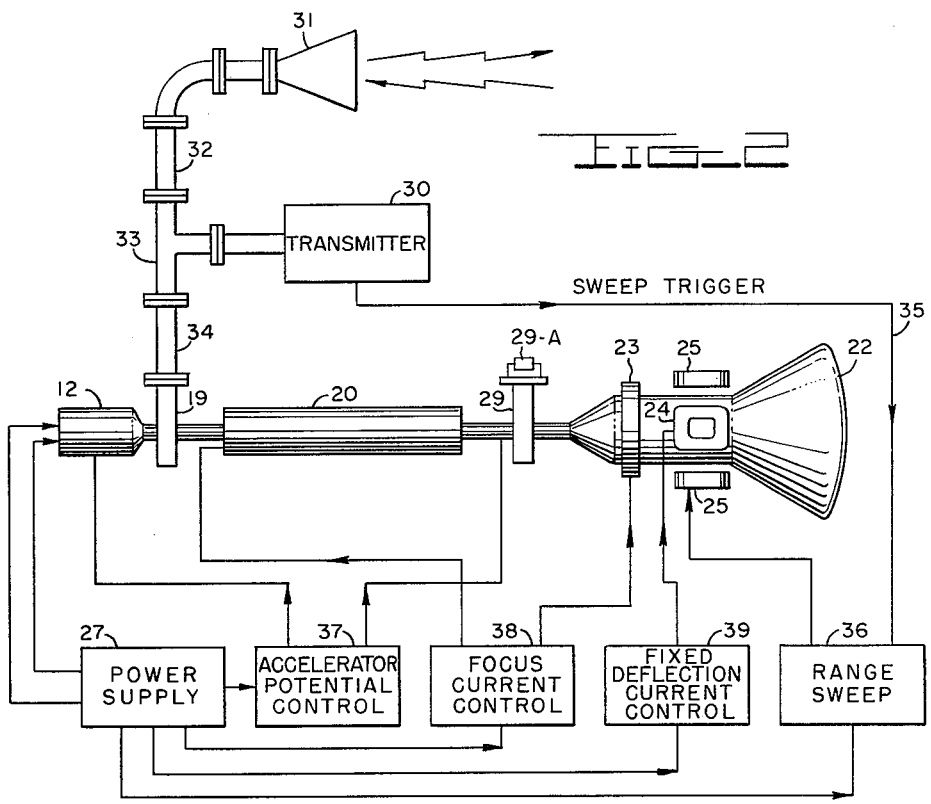
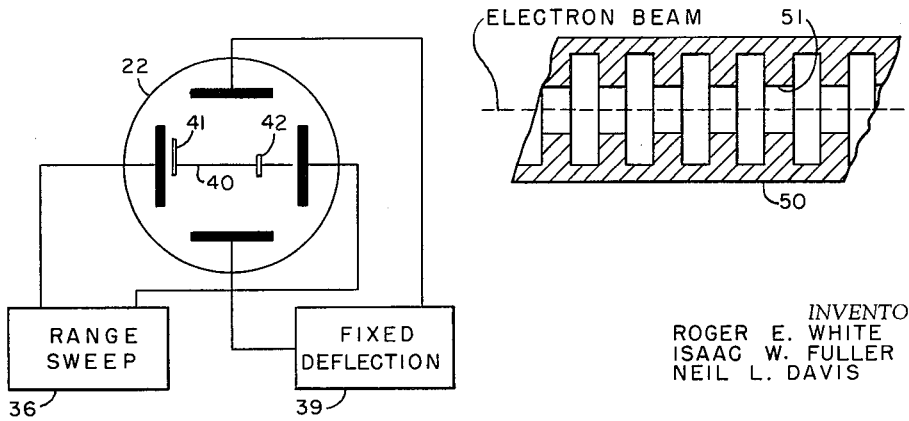

United States Patent Office 3,049,707
Patented Aug. 14, 1962

3,049,707
TRAVELING WAVE PRESENTATION DEVICE
Roger E. White, Groveton, Va., Isaac W. Fuller, Forest Heights, Md., and Neil L. Davis, Groveton, Va.
Filed May 1, 1951, Ser. No. 224,018
6 Claims. (Cl. 343—13)
(Granted under Title 35, U.S. Code (1952), sec. 266)

This invention relates generally to fluorescent screen devices and more particularly to a device for detecting and indicating the presence of an ultra high frequency wave directly on a fluorescent screen.

There are many applications in the electronic art where it is desirable to produce a visual indication of the presence of an ultra high frequency wave. A notable example is found in any radar system. Conventional systems produce the presentation by passing the received wave through a complex broadband receiver in which the modulation is detected and amplified and applied to a cathode ray tube. It is well known that operation and particularly broadband operation at ultra high frequencies requires many expensive and specially designed amplifier tubes and hardware.

Conventional amplifier tubes have proved inefficient at very high frequencies because of the greater effect of the interelectrode capacitance at high frequencies. As the frequency increases further the transit time of the electrons travelling between the electrodes also becomes a limiting factor. With unconventional tubes such as the reflex klystron, the upper limit has been extended by utilizing the transit time of the beam within a resonant chamber where it is velocity modulated. In another approach to the problem the upper limit has been extended by effectively slowing the radio frequency energy down to substantially the same velocity as that of an electron beam. This is done in a device called a "travelling wave tube," for which little practical application has been found heretofore. In this device, which will be described more fully below, a wave of ultra high frequency energy is passed parallel to an electron beam and the component of wave motion paralleling the beam is slowed to substantially the same speed as the beam by passing it through, for example, a helix while the beam travels a straight path. It has been found that with the wave effectively travelling parallel to and at substantially the same speed as the electron beam, it imparts both velocity and density modulation to the beam.

It is an object of this invention to obtain a radar type display on a fluorescent screen of a cathode ray tube by using the electron beam of a travelling wave tube as the cathode ray tube.

It is another object of this invention to modulate an electrton beam with low power radio frequency energy and project the modulated beam on a fluorescent screen to produce a visual indication of the modulation.

It is another object of this invention to provide a simplified system of radio frequency oscillography.

It is another object of this invention to provide a broadband ultra high frequency radar receiver.

Other objects and advantages of this invention will be apparent from the following description and accompanying drawings in which:

FIG. 2 is typical radar system in which this invention is the receiver-indicator;

FIG. 3 is a variant embodiment of a portion of FIG. 1; and

FIG. 4 is a variant embodiment of a portion of FIG. 2.

Figure 1:
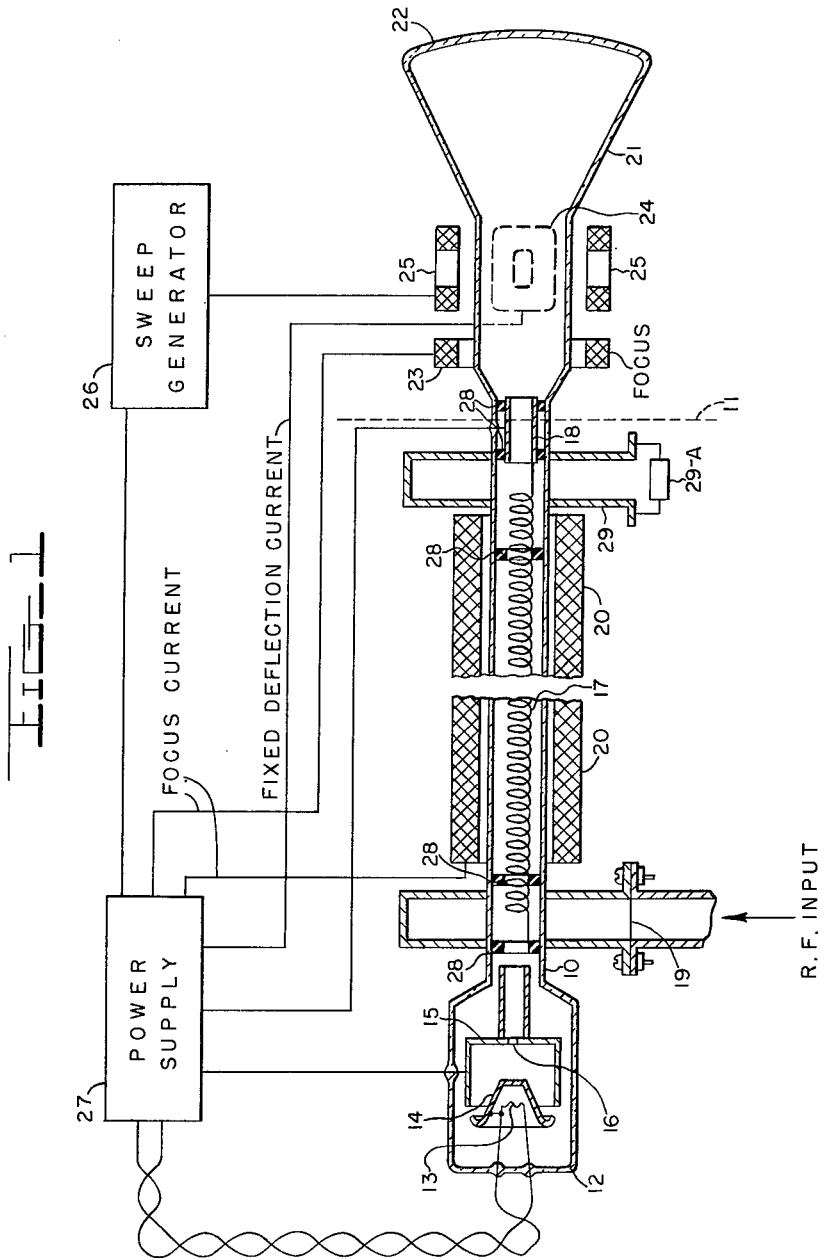
FIG. 1 is a representative embodiment of this invention partly in elevational cross-section and partly in block.

Briefly, this invention replaces the collector end of a travelling wave amplifier tube with a fluorescent screen and a fixed deflection field. Such sweep deflection fields as may be desired are also added. This arrangement by itself may then serve as a complete radar receiver and indicator system and more generally constitutes a novel system of radio frequency oscillography.

Referring now to the drawings in detail, FIG. 1 shows in cross-section on evacuated glass envelope 10 which to the left of vertical dashed line 11 comprises a conventional travelling wave tube such as described by Pierce and Field in Proc. of I.R.E., February 1947, pages 108–111. The left end 12 of envelope 10 is enlarged to house an electron gun structure comprising a heater 13, a cathode 14, and an anode 15. Electrons from cathode 14 are attracted toward anode 15 which has an aperture 16 in its center, because of an accelerating potential applied thereto. Electrons are attracted through aperture 16 by an elongated helix 17 and collector 18 which are electrically joined together and energized by an accelerating potential. The helix 17 is closely wound of low resistance wire and has a diameter which is small compared with the operating wavelength of the system. The length of the wire making up the helix is several times the operating wavelength. Helix 17 is centrally disposed in envelope 10 and is supported by annular dielectric spacers 28 which also support the collector 18.

Radio frequency waves are fed in through waveguide 19 and coupled to the left or beam input end of helix 17. These waves are conducted along helix 17 and because they move to the right in a spiral path, their progress in a direction parallel to the electron beam between cathode 14 and collector 18 is considerably slower than the speed of light. The ratio of the length of wire in the helix to the length of the helix is chosen so that the velocity of the wave component parallel to the beam is substantially the same as the velocity of the beam. An exemplary parallel wave velocity which has been found satisfactory in the 3600 mc. frequency range is ⅓ the speed of light.

An elongated focusing yoke 20 disposed outside envelope 10 surrounds helix 17 and axially focuses the electron beam along the axis of the helix. Upon reaching the collector end of the helix the radio frequency waves are coupled to the output waveguide 29. The waves are not further utilized in the embodiment of this invention shown in FIG. 1. The output waveguide 29 is terminated in its characteristic impedance 29A to prevent reflections of the wave back into the travelling wave tube. The termination may be a coupling to another network for further use or may be an absorbent load as shown at 29A in FIG. 1. Should greater sensitivity be desired, one or more conventional travelling wave tubes connected in tandem may precede the tube modified in accordance with this invention. To effect the tandem connection the output waveguide of each preceding tube is connected to the input waveguide of its succeeding tube. To the right of dashed line 11 this device differs from conventional travelling wave tubes, the collector 18 is open-ended and does not stop the beam, and the envelope 10 terminates at the right in a presentation system 21 comprising a fluorescent screen 22, focusing element 23, and quadrature deflection elements 24 and 25.

With a sweep generator 26 connected to one deflection means 25, and a power supply 27 for operating the travelling wave tube and the sweep generator and to provide a fixed deflection current for deflection means 24 and focus current for means 20 and 23 added to the apparatus thus far described in connection with FIG. 1, a complete system of radio frequency oscillography is provided. This system will provide broadband operation at microwave frequencies and will operate with signals of only a few millivolts without preamplification.

It will be noted that the center portion of the helix 17, envelope 10, and focusing yoke 20 is cut away to shorten the space requirements of the drawing. It will be apparent from the previous discussion that the length and diameter requirements of the helix vary with the operating wavelength and are a factor in the bandwidth. As the frequency is decreased below the center frequency, the number of wavelengths in the helix is reduced and amplification falls off. As the frequency is increased above the center frequency, the field produced by the wave lies closer to the helix structure and has less effect on the electron beam, therefore amplification again falls off. In an actual example, for a center frequency of 3600 mc. a helix 11 inches long and ¼ inch in diameter was selected to reduce the effective velocity of the wave by a factor of 13.

Considering now the operation of this invention, the indirectly heated cathode 14 produces an electron beam which is attracted to the right along the envelope 10 by the higher potential of the helix 17 and collector 18 and impinges on the fluorescent screen 22. The long focusing yoke 20 axially focuses the beam keeping it in the center of helix 17. Focus yoke 23 likewise compresses the beam to produce a spot on screen 17.

Radio frequency signal waves are picked up by helix 17 from waveguide 19 which is matched to the left and uncoiled end of helix 17. These waves travel to the right at substantially the same speed as the electron beam because of the retarding effect of the helix. Therefore a travelling wave is developed in the tube travelling at substantially the speed of the electron beam. Consequently the travelling field produced by the wave along the helix appears as a constant amplitude field to any given portion of the electron beam. Portions of the beam acted on by a wave crest tend to develop a bunching of electrons and the portions travelling in the region of the troughs tend to develop a thinning out of the electrons. Or in other words, the electrons in the troughs are accelerated or decelerated toward the adjacent crests. A more detailed explanation of this action is found in the above referred to article by Pierce and Field in the February 1947 Proc. of I.R.E. A mathematical explanation by Pierce is found on pages 111–123 of the same publication.

It follows then that the field produced by the wave in the helix produces velocity modulation of the electron beam. By the practice of this invention the velocity modulation of the beam is transformed into deflection of the beam thereby producing a visual indication of the radio frequency wave. This is accomplished with the fixed deflection field produced by means 24. Since deflection sensitivity in cathode ray oscillography is a function of the beam velocity, velocity modulation of the beam in the travelling wave portion of the tube produces a modulation of the deflection sensitivity. Therefore, when the beam is subjected to a fixed deflection field and its velocity is changed, a deflection will be traced on the fluorescent screen. If the conventional sawtooth type of sweep is applied from generator 26 to deflection yoke 25 to sweep the beam at right angles to the deflection produced by the R.F. wave, the R.F. signal wave will be traced out on the screen 22.

The apparatus shown in FIG. 1 has all the necessary elements of a radar receiving system if the sweep generator 26 is synchronized with the radar transmitter. This invention is shown as the receiver-indicator of a radar system in FIG. 2. In FIG. 2 a pulse type radar transmitter is shown connected to a horn type antenna 31 through waveguide 32 and T-connection 33. Another section of waveguide 34 connects the antenna through the same T-connection to the travelling wave tube input waveguide 19. No receiver protective device such as a T—R box is required with this invention since there is no crystal in the receiver input to burn out and it is characteristic of the travelling wave tube to present degenerative gain characteristics to large amplitude signals and to have a rapid recovery time.

A trigger signal is applied from transmitter 30 through line 35 to the range sweep generator 36. In FIG. 2 the power supply of 27 is shown connected to the tube through control means for the accelerator potential 37, the focus 38, and the fixed deflection current 39, the operation of the system is conventional. The sweep begins to deflect the beam from left to right as shown in FIG. 4 when the transmitter 30 initiates a pulse. Energy reflected back from any objects in the path of the antenna 31 reenters the antenna and feeds through the waveguide to the helix in envelope 10 where it becomes a relatively slowly travelling wave which velocity modulates the electron beam to produce a deflection on screen 22 at right angles to the range trace. The position of this deflection on the range trace is an indication of the range of the reflecting object.

FIG. 4 shows a front view of screen 22 showing the range trace 40, a small deflection 41 from the transmitted pulse, and a deflection 42 from a reflected pulse. It will be apparent that either magnetic or electrostatic deflection may be used with this invention. The former is shown in FIGS. 1 and 2, FIG. 4 shows the connection for the fixed and sweep deflection circuits to deflection plates.

The practice of this invention is not limited to any particular embodiment of travelling wave tube. The electron gun structure may be a triode or pentode arrangement and the helix may be a number of different sizes. In fact it is not necessary to use a helix as long as some method of slowing the effective velocity of the wave is accomplished. One substitute method is illustrated in FIG. 3, which shows in cross-section the center or wave retarding portion of a travelling wave tube. For the type of tube in FIG. 3 the R.F. wave is fed into a circular waveguide 50 having a series of circular baffles 51 suitably spaced to slow the progress of the wave.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. In a radar system including a pulse transmitter and an antenna, a receiver-indicator comprising an elongated evacuated chamber, an electron gun at one end thereof, a fluorescent screen at the other end thereof providing a target for said electron gun, modulation means for imparting velocity modulation to the electron beam between said gun and said screen, said modulation means being disposed between said gun and said screen and having a length of several wavelengths measured at the operating wavelength for a velocity of propagation substantially equal to the velocity of the electron beam, input means at the gun end of said modulation means, means connecting said antenna to said input means, means for changing the velocity modulation of the beam to deflection, a range sweep generator synchronized with said transmitter, and deflection means at the screen end of said modulation means connected to said sweep generator.

2. In a radar system including a pulse transmitter and an antenna, a receiver-indicator comprising an elongated evacuated chamber, an electron gun at one end thereof, a fluorescent screen at the other end thereof providing a target for said electron gun, modulation means for imparting velocity modulation to the electron beam between said gun and said screen, said modulation means being disposed between said gun and said screen and having a length of several wavelengths measured at the operating wavelength for a velocity of propagation substantially equal to the velocity of the electron beam, input means at the gun end of said modulation means, waveguide means connecting said antenna directly to said transmitter and said input means, means for changing the velocity modulation of the beam to deflection, a range sweep generator synchronized with said transmitter, and deflection means at the screen end of said modulation means connected to said sweep generator.

3. In a radar system including a pulse transmitter and an antenna, a receiver-indicator comprising an elongated evacuated chamber, an electron gun at one end thereof, a fluorescent screen at the other end thereof providing a target for said electron gun, modulation means for imparting velocity modulation to the electron beam between said gun and said screen, said modulation means being disposed between said gun and said screen and having a length of several wavelengths measured at the operating wavelength for a velocity of propagation substantially equal to the velocity of the electron beam, input means at the gun end of said modulation means, waveguide means connecting said antenna directly to said transmitter and said input means, a range sweep generator synchronized with said transmitter, and first and second deflection fields at the screen end of said modulating means, said first field being a constant deflection field and said second field being produced by said sweep generator.

4. In a radar system including a pulse transmitter and an antenna, a receiver-indicator comprising an elongated evacuated chamber, an electron gun at one end thereof, a fluorescent screen at the other end thereof providing a target for said electron gun, retarding means disposed between said gun and screen for retarding the velocity of propagation of a radio frequency wave in a direction parallel to an electron beam between said gun and said screen to substantially equal the velocity of said beam, input means at the gun end of said retarding means, waveguide means connecting said antenna directly to said transmitter and said input means, a range sweep generator synchronized with said transmitter, and first and second deflection fields at the screen end of said retarding means, said first field being a constant deflection field and said second field being produced by said sweep generator.

5. A radar system comprising means for transmitting pulsed electromagnetic wave energy of predetermined frequency to a remote object for return therefrom and for intercepting the returned wave energy, said last means comprising a directional antenna, a traveling wave tube coupled to said directional antenna for modulating an electron beam therein at said predetermined frequency with the returned wave energy intercepted by said directional antenna, said traveling wave tube comprising a visual indicator system disposed to receive the modulated beam and having deflection means for generating a visual presentation of range of said remote object.

6. A radar system comprising means for transmitting pulsed electromagnetic wave energy of predetermined frequency to a remote object for return therefrom and for intercepting the returned wave energy, said last means comprising an antenna, a traveling wave tube coupled to said antenna for modulating an electron beam therein at said predetermined frequency with the returned wave energy intercepted by said antenna, said traveling wave tube comprising a visual indicator system disposed to receive the modulated beam and having deflection means for generating a visual presentation of range of said remote object.

References Cited in the file of this patent
UNITED STATES PATENTS

| | | |
|---|---|---|
| 2,272,165 | Varian et al. | Feb. 3, 1942 |
| 2,415,981 | Wolff | Feb. 18, 1947 |
| 2,535,317 | Pierce | Dec. 26, 1950 |
| 2,578,434 | Lindenblad | Dec. 11, 1951 |
| 2,630,544 | Tiley | Mar. 3, 1953 |

OTHER REFERENCES

Journal of Applied Physics, vol. 10, No. 5, May 1939, pages 321 to 327, A High Frequency Oscillator and Amplifier by Varian et al.